(12) United States Patent
Henderson

(10) Patent No.: US 7,386,227 B1
(45) Date of Patent: Jun. 10, 2008

(54) METHOD AND APPARATUS FOR PHOTOGRAPHIC ILLUMINATION

(76) Inventor: Drew Henderson, 76 Stony Hill Rd., Bethel, CT (US) 06801

( * ) Notice: Subject to any disclaimer, the term of this patent is extended or adjusted under 35 U.S.C. 154(b) by 445 days.

(21) Appl. No.: 11/220,312

(22) Filed: Sep. 6, 2005

(51) Int. Cl.
G03B 15/03 (2006.01)

(52) U.S. Cl. ...................................... 396/164; 396/175

(58) Field of Classification Search ............... 396/164, 396/175
See application file for complete search history.

(56) References Cited

U.S. PATENT DOCUMENTS

| 4,144,556 | A |   | 3/1979  | Bond ........................... 362/16 |
|-----------|---|---|---------|-----------------------------------------|
| 4,255,045 | A | * | 3/1981  | Eisenberg ..................... 355/37  |
| 4,383,287 | A |   | 5/1983  | Fette ........................... 362/18 |
| 4,446,506 | A |   | 5/1984  | Larson ......................... 362/17  |
| 4,669,031 | A |   | 5/1987  | Regester ....................... 361/16  |
| 4,847,663 | A |   | 7/1989  | Query .......................... 355/70  |
| 5,023,756 | A |   | 6/1991  | Regester ....................... 362/16  |
| 5,077,640 | A |   | 12/1991 | Butler, Jr. ..................... 362/11 |
| 5,164,755 | A |   | 11/1992 | King ........................... 396/544 |
| 5,887,963 | A |   | 3/1999  | Baijan ......................... 362/11  |
| 6,343,184 | B1|   | 1/2002  | Huebner ......................... 396/3  |
| 6,788,886 | B2|   | 9/2004  | Saigo et al. .................... 396/4  |
| 7,204,617 | B1| * | 4/2007  | Finn ........................... 362/367 |
| 2004/0004193 | A1 | * | 1/2004 | Nilson et al. ............ 250/458.1 |
| 2005/0219535 | A1 | * | 10/2005 | Nilson et al. ................ 356/417 |

FOREIGN PATENT DOCUMENTS

| CA | 2.280.060 | 3/2000  |
| GB | 2.392.511 | 3/2004  |
| JP | 200330160 | 11/2000 |

* cited by examiner

Primary Examiner—W. B. Perkey
Assistant Examiner—Warren K Fenwick
(74) Attorney, Agent, or Firm—Michael I Kroll

(57) ABSTRACT

A method and apparatus for photographic illumination comprising a light box having a top surface with spaced apart walls depending therefrom having an aperture in one wall thereby forming a chamber for the placement therein of an article or articles to be photographed and wherein said light box material is light diffusing. The method further comprises a camera mountable apparatus having means for securing said apparatus to a camera, means for producing illumination, means for producing light beams including fiber optics and multiple LEDs, means for varying the number of beams projected onto the photographic subject. The present invention uses two different light sources, for the photography of gemstones or the like.

18 Claims, 11 Drawing Sheets

METHOD AND APPARATUS FOR PHOTOGRAPHIC ILLUMINATION

BACKGROUND OF THE INVENTION

1. Field of the Invention

The present invention relates generally to photographic equipment and, more specifically, to a method and apparatus for photographic illumination comprising a light box having a top surface with spaced apart walls depending therefrom having an aperture in one wall thereby forming a chamber for the placement therein of an article or articles to be photographed and wherein said light box material is light diffusing. The method further comprises a camera mountable apparatus having means for securing said apparatus to a camera, means for producing illumination, means for producing light beams including fiber optics and multiple LEDs, means for varying the number of beams projected onto the photographic subject. The present invention uses two different light sources, for the photography of gemstones or the like.

The camera mountable illuminable object is comprised of an illuminable element, preferably ring shaped, mounted in a ring shaped cavity formed between the apparatus camera mounting means and apparatus exterior wall that also forms the cavity top surface having a plurality of pin-hole apertures passing therethrough, thereby producing a plurality of light beams. Rotatively mounted over the beam producing member are overlays having radially extending alternating opaque spokes, serving to block the light beams, and apertures allowing passage therethrough. Manipulation of one overlay relative to another can block all light beams or project a varying number of beams from varying angles of subject article incidence.

2. Description of the Prior Art

There are other methods and devices designed for photography. Typical of these is U.S. Pat. No. 4,144,556 issued to Bond on Mar. 13, 1979.

Another patent was issued to Fette on May 10, 1983 as U.S. Pat. No. 4,383,287. Yet another U.S. Pat. No. 4,446,506 was issued to Larson on May 1, 1984 and still yet another was issued on May 26, 1987 to Regester as U.S. Pat. No. 4,669,031.

Another patent was issued to Query on Jul. 11, 1989 as U.S. Pat. No. 4,847,663. Yet another U.S. Pat. No. 5,023,756 was issued to Regester on Jun. 11, 1991. Another was issued to Butler, Jr. on Dec. 31, 1991 as U.S. Pat. No. 5,077,640 and still yet another was issued on Nov. 17, 1992 to King as U.S. Pat. No. 5,164,755.

Another patent was issued to Baijan on Mar. 30, 1999 as U.S. Pat. No. 5,887,963. Yet another U.S. Pat. No. 6,343,184 was issued to Huebner on 6,343,184. Another was issued to Saigo, et al. on Sep. 7, 2004 as U.S. Pat. No. 6,788,886 and still yet another was issued on Mar. 2, 2000 to Finn as Canadian Patent No. CA2280060. Another was issued to Shigeru, et al. on Nov. 30, 2000 as Japanese Patent No. JP2000330160 and still yet another was issued on Mar. 3, 2004 to Lai as U.K. Patent No. GB2392511.

U.S. Pat. No. 4,144,556

Inventor: George S. Bond

Issued: Mar. 13, 1979

An object to be photographed is illuminated with substantially omni-directional, glare-free lighting. The object is placed within an ovoidal shell, inward from an access opening at one end, and supported on a platform formed by a flattened bottom surface of the shell. The entire inner surface of the shell is a light-diffusing surface and is illuminated by a light source which is shielded from direct illumination of the object. The ovoidal diffusing surface reflects light back and forth from and onto itself to produce substantially uniform omni-directional illumination within the shell. The object is supported far enough inward from the access opening of the shell to receive such omni-directional illumination so that it is well lighted for photographing and, in the absence of direct-lighting illumination, appears substantially glare-free. Any highlights desired for photographic purposes are produced by direct lighting from a suitable source, as by controlled direct lighting from the main light source or from a supplemental lamp.

U.S. Pat. No. 4,383,287

Inventor: Frank E. Fette

Issued: May 10, 1983

The invention pertains to a method and apparatus for illuminating a subject to be photographed wherein the subject is illuminated in such a manner that a uniform highlight is produced upon reflective surface, substantially uniform illumination of the subject is achieved at front and lateral areas, and the background may be modified to lower the background contrast, and if desired, the background may be removed completely. A light source of elongated configuration produces a uniform light source of a vertical dimension greater than the vertical dimension of the subject being photographed. The light source is translated across the subject matter at a predetermined uniform rate while the camera aperture is open while photographing the front and lateral portions of the subject illuminated by the light source. The passing of the light source behind the subject lowers the contrast of the existing background, and such contrast may be sufficient to remove the background completely, if desired. Apparatus for supporting and translating the light source may include a permanent mounting wherein the light source revolves in a circle, or the light source may be mounted upon a portable platform driven by a constant speed motor for producing a uniform displacement of the light source.

U.S. Pat. No. 4,446,506

Inventor: Raymond G. Larson, et al.

Issued: May 1, 1984

A uniquely configured, constructed photographic light diffuser device for association with a photographic light source, which is versatile in that it is easily and releasably associated with variously configured light sources used in the photographic field, wherein the device is made up of articulated panel segments, the segments having different light reflecting, or diffusing qualities, wherein the diffusing member is easily and releasably associated with the light directing device so as to be able to make up a myriad of difference selected, polygonal configurations to vary lighting patterns and light intensity on photographic objects. The device is light weight and collapsible for ease of carrying and is particularly applicable to the photography field wherein it is desired to achieve and attain various lighting affects.

U.S. Pat. No. 4,669,031

Inventor: Gary L. Regester

Issued: May 26, 1987

A photographic light box comprised of a housing having a side wall with a pair of opposed ends, one of the ends being larger than the other end and the side wall progressively increasing in cross section as the smaller of the two ends is approached. A panel capable of transmitting diffused light is secured to the side wall across the larger end of the housing, the smaller end being open to receive a light source including a lamp disposed within the housing and capable of being energized to produce light. The housing has a plurality of flexible rods extending along the side wall at spaced locations thereon and the ends of the rods near the smaller end of the housing are inserted into holes in spaced block carried by a strap surrounding the light source as the light source extends into the opening of the housing. The rods are bent to permit insertion of the ends of the rods into the block and this bending of the rods provides a bias force to cause the housing to expand and substantially stretch the light diffusing panel at the larger end of the housing. The housing can be collapsed when not in use and rolled into a compact shape for insertion into a tube for shipment or storage.

U.S. Pat. No. 4,847,663

Inventor: Frances L. Query

Issued: Jul. 11, 1989

A method and apparatus to quickly and efficiently photograph highly reflective items utilizing a copy camera. Light reflection off, and shadows from the object to be photographed, the surfaces of the copy camera, and nearby, photentially interfering objects are reduced to obtain reflection free photographs. A shadow box is placed around the object and covers are placed over the camera parts and between the lights and the object.

U.S. Pat. No. 5,023,756

Inventor: Gary L. Regester

Issued: Jan. 11, 1991

An improved light diffusion box for photographic, industrial and consumer uses. The light diffusion box includes a hollow housing of fabric material provided with a front screen and having means for securing a ring to the rear end thereof, the ring being adapted to mount a light source within the housing. The housing has sides which are coupled together and each side has a silver laminate layer adjacent to a thin, white nylon layer. A deflection/transmission panel is between the light source and the front screen. A graduated or alternated deflection/transmission pattern is printed on at least one face of the panel and such pattern is equal and opposite to the naturally-occurring light fall-off from the light source. The center of the pattern forces the strong light nearest the source to be largely deflected into the sidewalls of the housing and only slightly transmitted. As the pattern radiates outwardly on the panel the pattern allows more and more light to be transmitted through the panel and less to be deflected.

U.S. Pat. No. 5,077,640

Inventor: C. Tyler Butler, Jr.

Issued: Dec. 31, 1991

A lighting environment for photography provides light completely around an object to be photographed. A circular diffusing screen forms the inner wall of a light box, and lights are mounted in the light box to illuminate the diffusing screen. The lights are variable in intensity so the light level around the diffusing screen can be varied. The light box is carried on cables that are individually adjustable so the height and the attitude of the light box can be varied.

U.S. Pat. No. 5,164,755

Inventor: Jack N. King

Issued: Nov. 17, 1992

A camera accessory for adapting a camera for macro photography including an adaptor for attaching the accessory to the lens of the camera, an adjustable bellows formed of translucent material for admitting diffused lights to all sides of the subject, and an extension bellows also formed of translucent material for larger subjects or subjects to be photographed at a greater distance from the lens.

U.S. Pat. No. 5,887,963

Inventor: Johnny B. Baijan

Issued: Mar. 30, 1999

This lighting apparatus consists of an elongated double bulb mounted to a flash unit and extending through two reflector devices. The first of these reflectors is conical and upwardly directed and the second of these reflectors is curved and forwardly directed. The extended bulb comprises a pair of short bulbs joined by a connector forming an electrical and mechanical connection.

U.S. Pat. No. 6,343,184

Inventor: Roger F. Huebner

Issued: Jan. 29, 2002

An apparatus comprising a support element, a frame or enclosure rotatably attached to the support element and a camera rotatably attached to the frame or enclosure. The frame or enclosure can rotate about a subject placed on the support element in the horizontal and in the vertical. A camera mounted on the frame or enclosure rotates about the subject with the frame or enclosure and can also move toward or away from the subject. The frame can be covered with translucent material to create an enclosure around the subject and lighting may be applied either from outside the enclosure or inside the enclosure by placing lights affixed to the external frame through the material. In one embodiment, solid translucent material such as plexiglass can be both the frame and the enclosure. The support element includes at least one arm connected to a stage support which mounts a rotatable stage upon which the subject to be photographed is placed. The frame can support materials to create enclosures that are spherical in shape, conical, hemispherical and combinations of spheres, cones and hemispheres. The frame rotates about the support so that the subject stays stationary on the stage and the background of the subject always stays the same as the frame and camera rotate.

U.S. Pat. No. 6,788,886

Inventor: Tsuyoshi Saigo, et al.

Issued: Sep. 7, 2004

The present invention provides a method for photographing lustrous objects, including even spectacle frames with highly reflective surfaces such as metal frames, that enables the objects to be photographed more naturally and aesthetically without any reflection on the surface of the camera or lens. The present invention also provides a method for photographing spectacle frames and a method for creating an electronic spectacle frame catalogue using this method. The method is one in which the camera 2 photographs the lustrous object 1. Optical shield members 3, 4, and 5 are placed between the camera body 21 and the lens 22 of the camera 2, and the lustrous object 1 so that a reflection of said camera 2 is not be formed on the photographed image of the lustrous object. In addition, an opening 41, having a size and shape suitable for photographing an image of the lustrous object 1, is provided in the shield member 4 of the lens 22.

Canadian Patent Number CA2280060

Inventor: Bruce L. Finn

Issued: Mar. 2, 2000

A lighting box has a housing with an open front and open rear and a bar such as speed rail TM extending horizontally across the housing. Multiple stage-type lights are mounted on the bar and positioned to send light out the front of the box. The box also has a diffusion element (frame) disposed proximate its front end, and even may have multiple elements including having one element at an angle. The element or elements receive the light from the lighting instruments and diffuse it to provide a soft projected light from the box. In accordance with one aspect of the invention, this light may be used to provide diffused light as pan of the key lighting for a stage or set, and may provide such sofa projected lighting from a front (downstage) of the stage or set.

Japanese Patent Number JP2000330160

Inventor: Wada Shigeru, et al.

Issued: Nov. 30, 2000

PROBLEM TO BE SOLVED: To provide a light source device that is constituted so that light is prevented from being leaked and the measuring accuracy is prevented from being deteriorated by efficiently discharging heat. SOLUTION: The light source device 50 is constituted of a projecting light source 52, a reflector 60 having a reflecting surface 63 of a specified reflectance, a projecting optical system 56 and a light box main body, and the light box main body holds the reflector 60, the projecting light source 52 and the optical system 56 at a specified position on a projecting optical axis. It possesses a reflection preventive member 68 which is arranged adjacently to the reflector 60 and whose inner surface opposed to the projecting light source 52 is a reflection preventive surface at least at part of a light source side end surface of the light box main body.

U.K. Patent Number GB2392511

Inventor: Peng-Cheng Lai

Issued: Mar. 3, 2004

A light box assembly includes an upper plastic frame and a lower plastic frame (22) and each of them can be formed by a plastic sheet or two plastic sheets. At least four supporting columns (24) are used to connect and support the two plastic frames (22). A plurality of side plates (26), an upper cover plate (28) and a lower cover plate (30) are separately installed according to different planes formed by each of the plastic frames and each of the supporting columns so as to construct a box body (30). An erect diffusion plate (32) is provided at each corner of the box body corresponding to the position of its relative supporting column (24) so that each of the four diffusion plates covers the outer field of a respective vertical light tube (34). Uniformly distributed light is provided, and a solid and uniform light source can also be provided. The invention provides a structure of box body (30) by using the same plastic members in accordance with their supporting columns and side plates as well as employing a sliding-in method for assembling each component so that fast assembly as well as easy assembly and disassembly can be achieved.

While these devices may be suitable for the purposes for which they were designed, they would not be as suitable for the purposes of the present invention, as hereinafter described.

SUMMARY OF THE PRESENT INVENTION

A primary object of the present invention is to provide a method and apparatus for photographic illumination.

Another object of the present invention is to provide a method and apparatus for photographic illumination incorporating a light box of diffuse material having an aperture wherein said light box provides means for inserting a subject for photography therein.

Yet another object of the present invention is to provide a method and apparatus for photographic illumination wherein said apparatus incorporates an illuminable element therein.

Still yet another object of the present invention is to provide a method and apparatus for photographic illumination incorporating means for generating a plurality of light beams.

Another object of the present invention is to provide a method and apparatus for photographic illumination incorporating means for varying the number of light beams.

Yet another object of the present invention is to provide a method and apparatus for photographic illumination incorporating means for varying which light beams are emitted.

Still yet another object of the present invention is to provide a method and apparatus for photographic illumination incorporating means for adjusting the angle of incidence of the light beams to the photographic subject without requiring the movement or rotation of the camera.

Additional objects of the present invention will appear as the description proceeds.

The present invention overcomes the shortcomings of the prior art by providing a light box having a top surface with spaced apart walls depending therefrom having an aperture in one wall thereby forming a chamber for the placement therein of an article or articles to be photographed and wherein said light box material is light diffusing. The method further comprises a camera mountable apparatus having means for securing said apparatus to a camera, means for producing illumination, means for producing light beams, means for varying the number of beams projected onto the photographic subject and means for adjusting the angle of incidence of the light beams to the photographic subject without requiring the movement or rotation of the camera.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
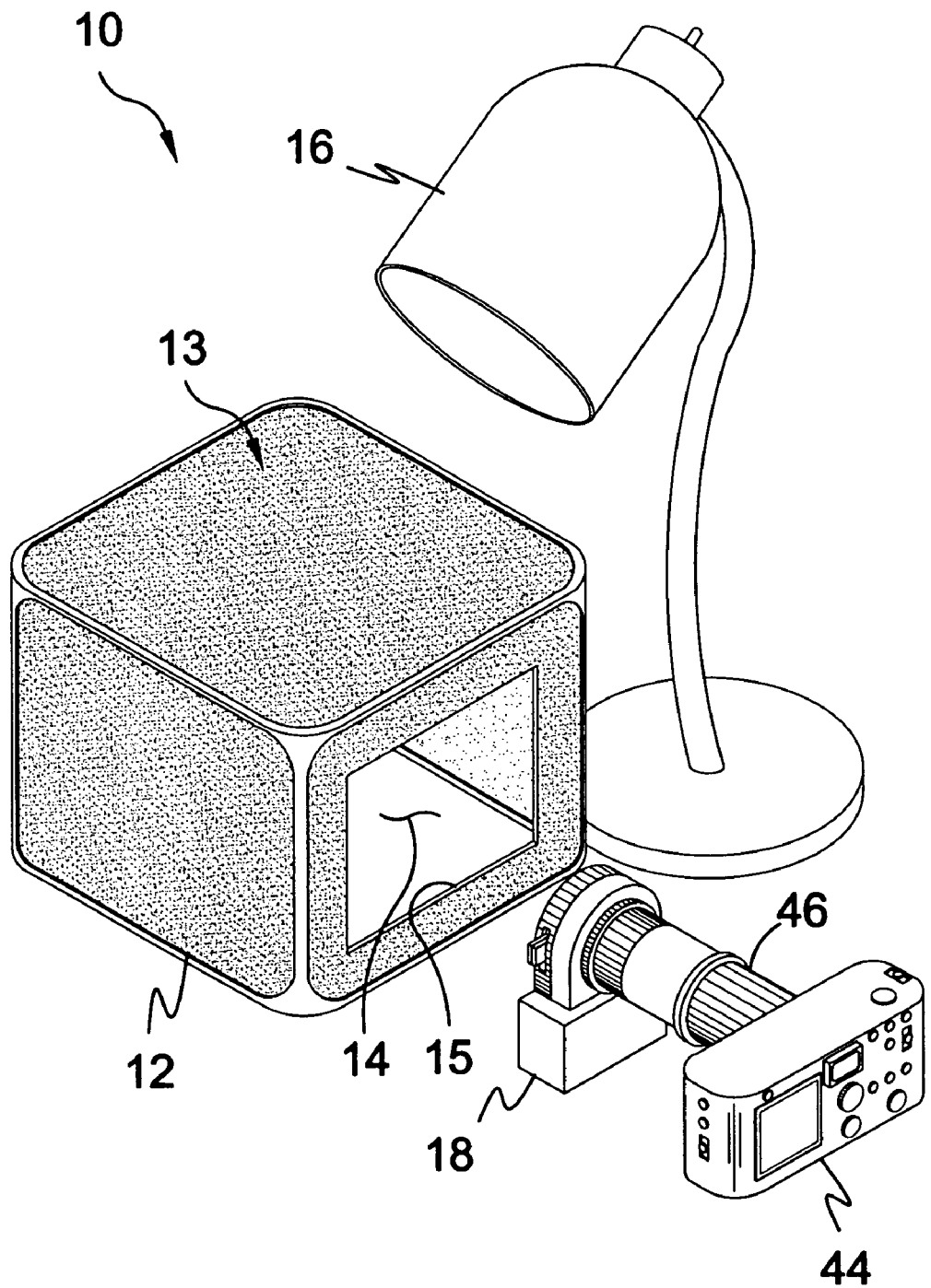
FIG. 1 is an illustrative view of the present invention in use.

Turning now descriptively to the drawings, in which similar reference characters denote similar elements throughout the several views, the figures illustrate the Method and Apparatus for Photographic Illumination of the present invention. With regard to the reference numerals used, the following numbering is used throughout the various drawing figures.

10 Apparatus for Photographic Illumination of the present invention.
12 diffusion chamber
13 light diffusing material
14 interior of 12
15 access opening of 12
16 external light source
17 light from 16
18 lighting instrument camera attachment
20 variable aperture collar assembly
22 inner collar
24 outer collar
26 outer collar flange
28 pinholes of 26
29 aperture ring
30 first aperture ring
32 second aperture ring
33 protruding adjustment tab
34 slotted recess
36 internal light-projecting means
38 light from 36
40 light beams
42 gemstone
44 camera
46 camera lens
48 refractive effects
50 camera attachment means

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is a lighting apparatus and method for photographing gemstones or jewelry composed of gemstones and metal. The lighting apparatus consists of two different light sources working in combination to achieve a desired lighting effect. An external light source 16 is directed towards a diffusion chamber 12 fabricated of a material 13 that enables light to pass through to the interior 14 portion thereof where the subject jewelry is positioned thereby providing a diffused and encompassing ambient light that is evenly distributed within the diffusion chamber 12 without causing glare. The other light source is an internal light-projecting means that is disposed within a lighting instrument camera attachment 18 and mounted on the camera lens 46 of the camera 44 to project a variable quantity of light beams through the access opening 15 in the diffusion chamber 12 towards the photographic article.

Figure 2:
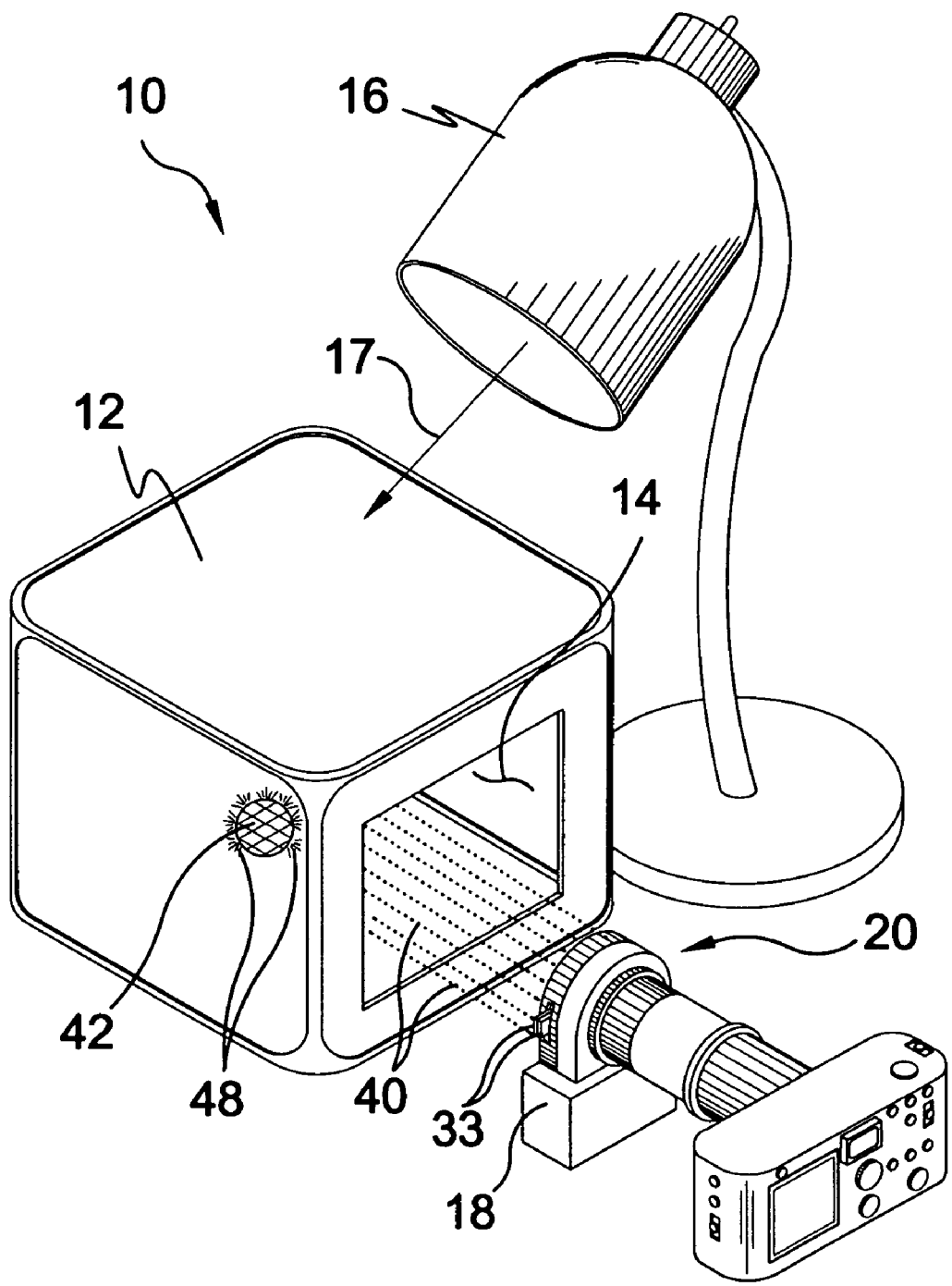
FIG. 2 is a perspective view of the present invention in use.

FIG. 2 is a perspective view of the present invention 10 in use. The lighting instrument is a five-sided diffusion chamber 12 that houses the subject jewelry 42 and is illuminated externally by light 17 from one or more continuous or flash light sources 16 which are required to illuminate the metal part of the jewelry 42 with a soft non-glaring even ambient light in the interior 14 of the diffusion chamber 12. The lighting instrument camera attachment 18 is aimed toward the gemstone 42 and illuminates it with multiple point light beams 40 to generate refractive effects 48 referred to as brilliance or sparkle or glitter. The refractive effects 48 may be adjusted accordingly by rotating the protruding adjustment tabs 33 of the variable aperture collar assembly 20 to vary the number of light beams 40 to be projected towards the gemstone 42. The essence of the present invention 10 is to have the two separate light sources work in concert to create any of a multitude of specific desired effects.

Figure 3:
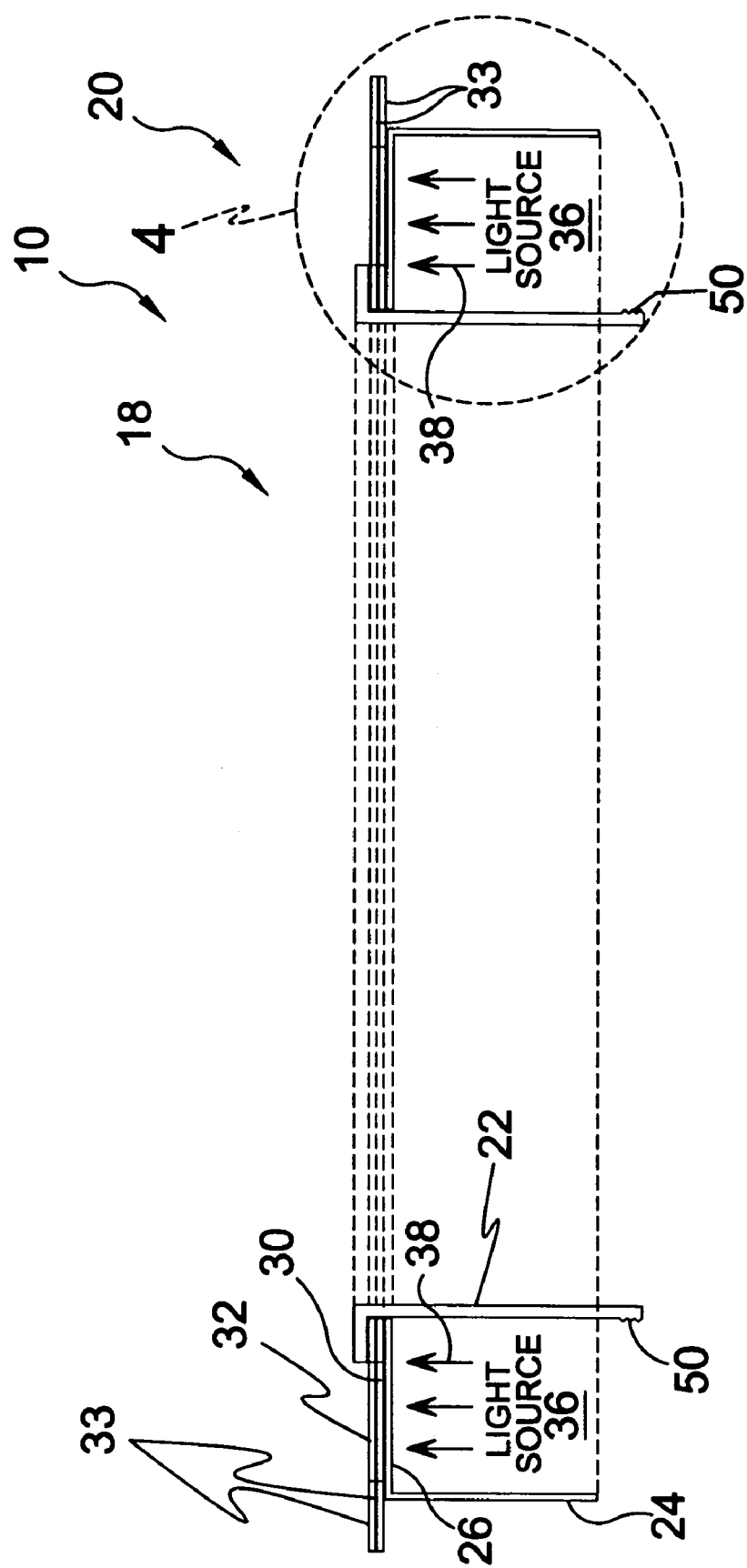
FIG. 3 is a sectional view of the variable aperture assembly of the present invention.

FIG. 3 is a sectional view of the variable aperture assembly 20 of the present invention 10. The lighting instrument 18 comprises a variable aperture assembly 20 that consists of an internal light-projecting source 36 behind three layers of thin opaque material each sized to completely cover the ring light 38 in such a manner such that when the aperture assembly 20 is closed there is no transmitted light 38 from the internal light source 36 to the subject jewelry. When the aperture assembly 20 is fully open a portion of the light 38 is allowed to pass to the subject jewelry through tiny holes or pinholes in the aperture. The variable aperture assembly 20 is supported by an inner collar 22 having a camera attachment means 50 and an outer collar 24 having a flange 26 extending perpendicularly therefrom towards the inner collar 22. A first aperture ring 30 and a second aperture ring 32 each with protruding adjustment tabs 33 are rotatably seated in face-to-face-to-face relation on the outer collar flange 26.

Figure 4:
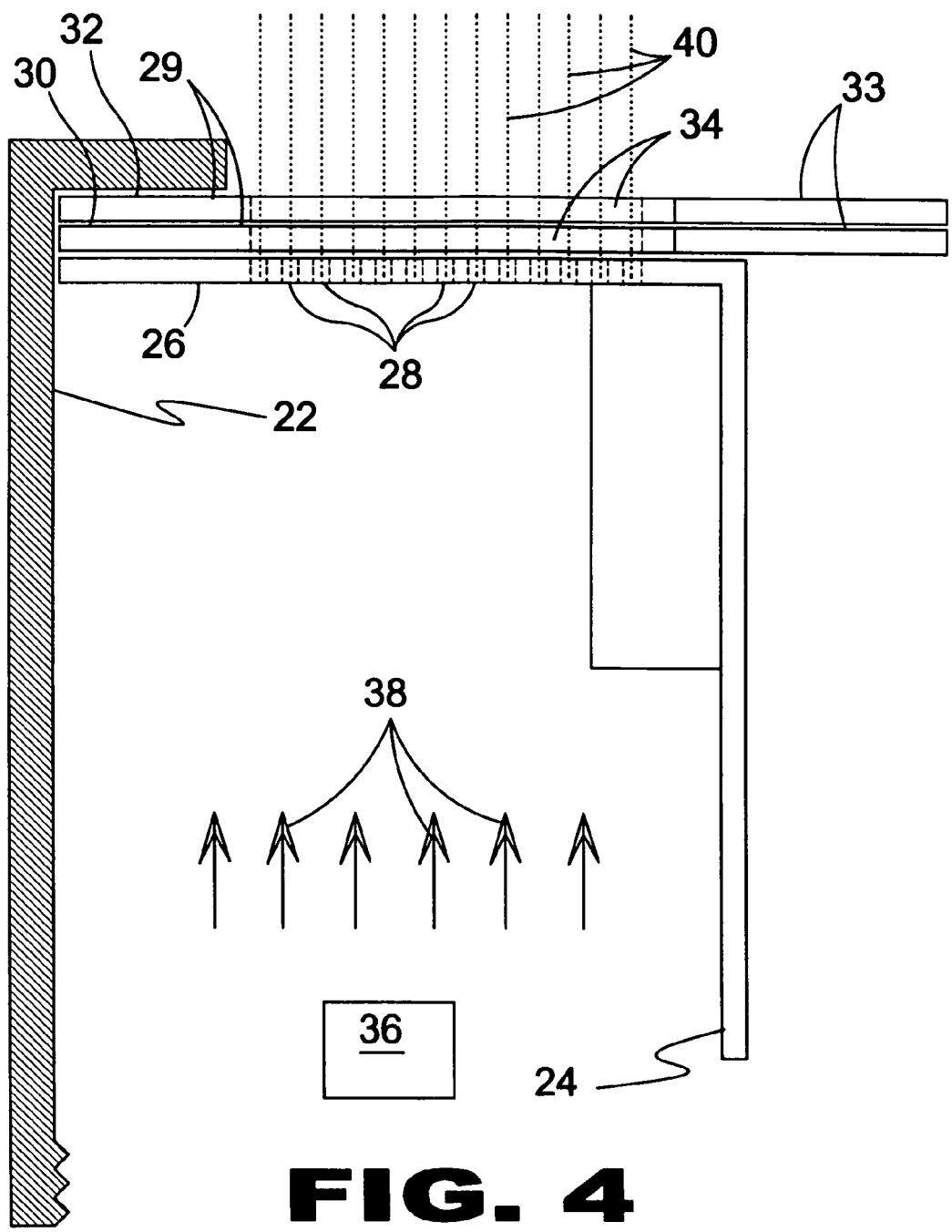
FIG. 4 is a detailed sectional view of the present invention.

FIG. 4 is a detailed sectional view of the present invention taken from FIG. 3 as indicated. Shown is the relationship between the inner collar 22, the outer collar 24, the outer collar flange 26 and the aperture rings 29. The alignment of the slotted recesses 34 in the first aperture ring 30 and the second aperture ring 32 determine how much (if any) light 38 from internal light source 36 is projected towards the article to be photographed. The aperture rings 29 are selectively rotated through the use of their associated adjustment tabs 33 to expose any number of the pinholes 28 in the outer collar flange 26 through which the light 38 from the internal light source 36 are projected as light beams 40.

Figure 5:
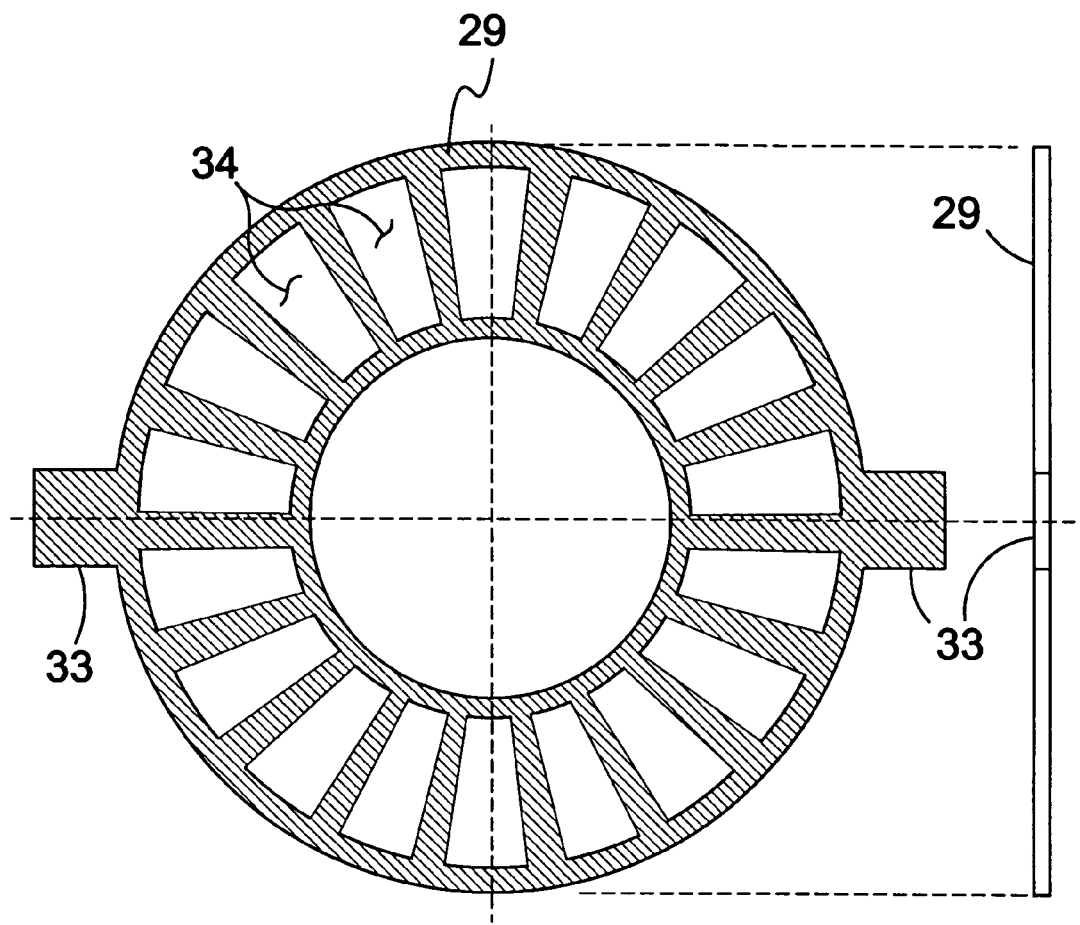
FIG. 5 is a sectional view of the aperture ring of the present invention.

FIG. 5 is a sectional view of the aperture ring 29 of the present invention. The lighting instruments variable aperture is adjustable to permit varying number of pinholes to pass light from the ring light to the subject. By rotating the aperture rings 29 through the use of the adjustment tabs 33 and aligning their slotted recesses 34 in relationship to each other and the camera lens, varying the number of pinhole are allowed to pass light from the ring light to the subject gemstone. Varying the number and position of the pinhole light sources to illuminate the gemstone, allows for a variety of refractive effects to be obtained in the gemstone.

Figure 6:
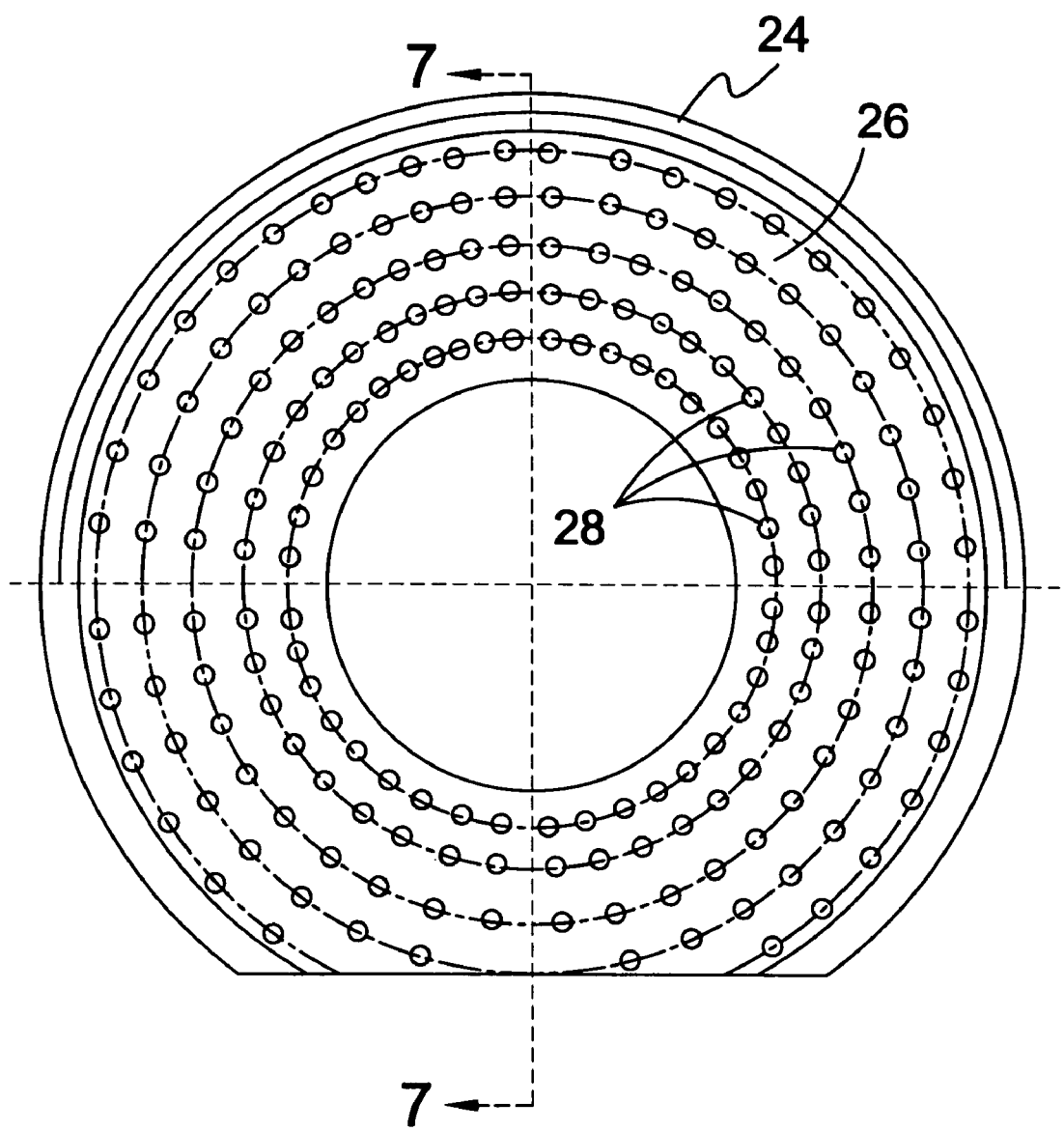
FIG. 6 is a sectional view of the outer collar of the present invention.

FIG. 6 is a sectional view of the outer collar 24 of the present invention. A plurality of pinholes 28 are concentrically arrange on the flange 26 of the outer collar 24. The lighting instruments provides rotational position movement with respect to the camera and subject, thereby allowing for varying the angle of incidence of the multiple pin hole 28 light sources to the facets of the gemstone. By varying the angle of incidence of the pinhole 28 light sources to the facets of the gemstone, varying refractive effects can be obtained.

Figure 7:
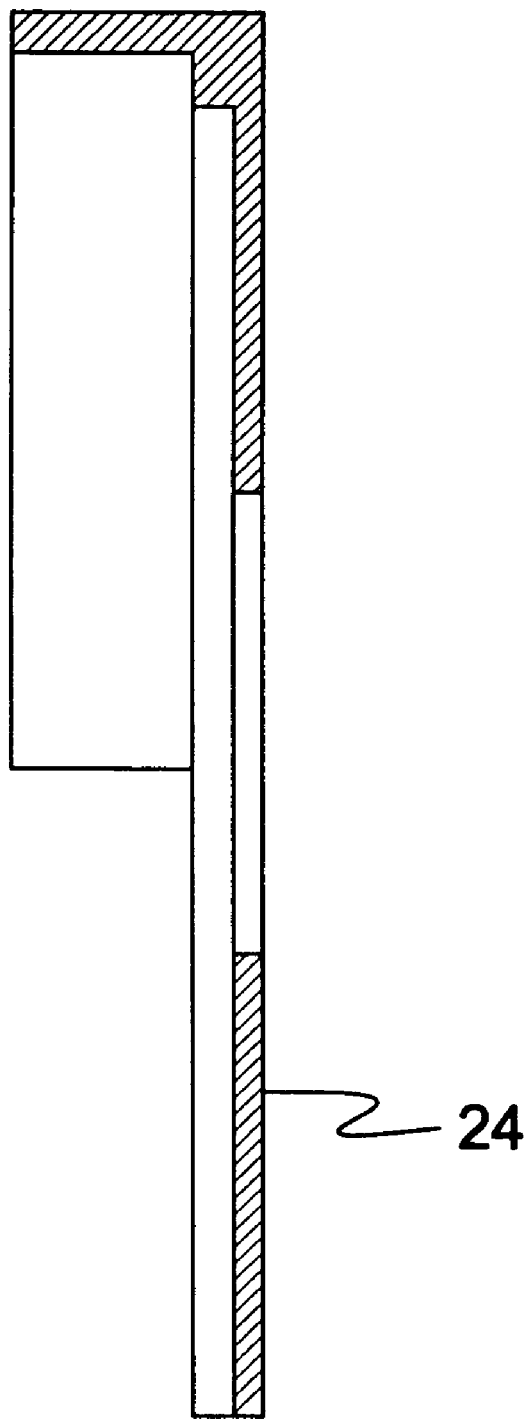
FIG. 7 is a cross sectional view of the outer collar of the present invention.

FIG. 7 is a cross sectional view of the outer collar 24 of the present invention. The lighting instruments provides rotational position movement with respect to the camera and subject, thereby allowing for varying the angle of incidence of the multiple pin hole light sources to the facets of the gemstone. By varying the angle of incidence of the pinhole light sources to the facets of the gemstone, varying refractive effects can be obtained.

Figure 8:
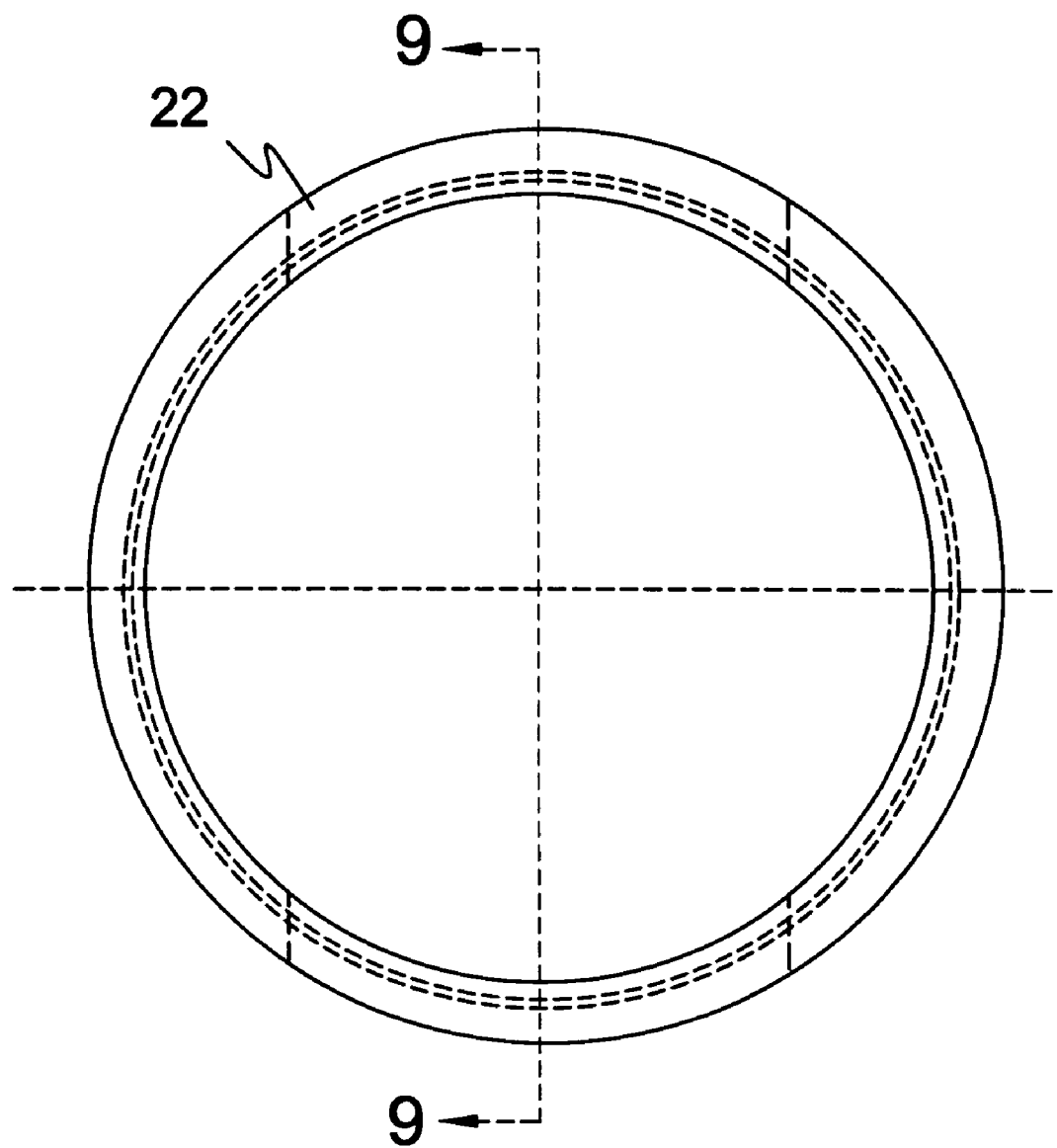
FIG. 8 is a cross sectional view of the inner collar of the present invention.

FIG. 8 is a cross sectional view of the inner collar 22 of the present invention. The lighting instruments provides rotational position movement with respect to the camera and subject, thereby allowing for varying the angle of incidence of the multiple pin hole light sources to the facets of the gemstone. By varying the angle of incidence of the pinhole light sources to the facets of the gemstone, varying refractive effects can be obtained.

Figure 9:
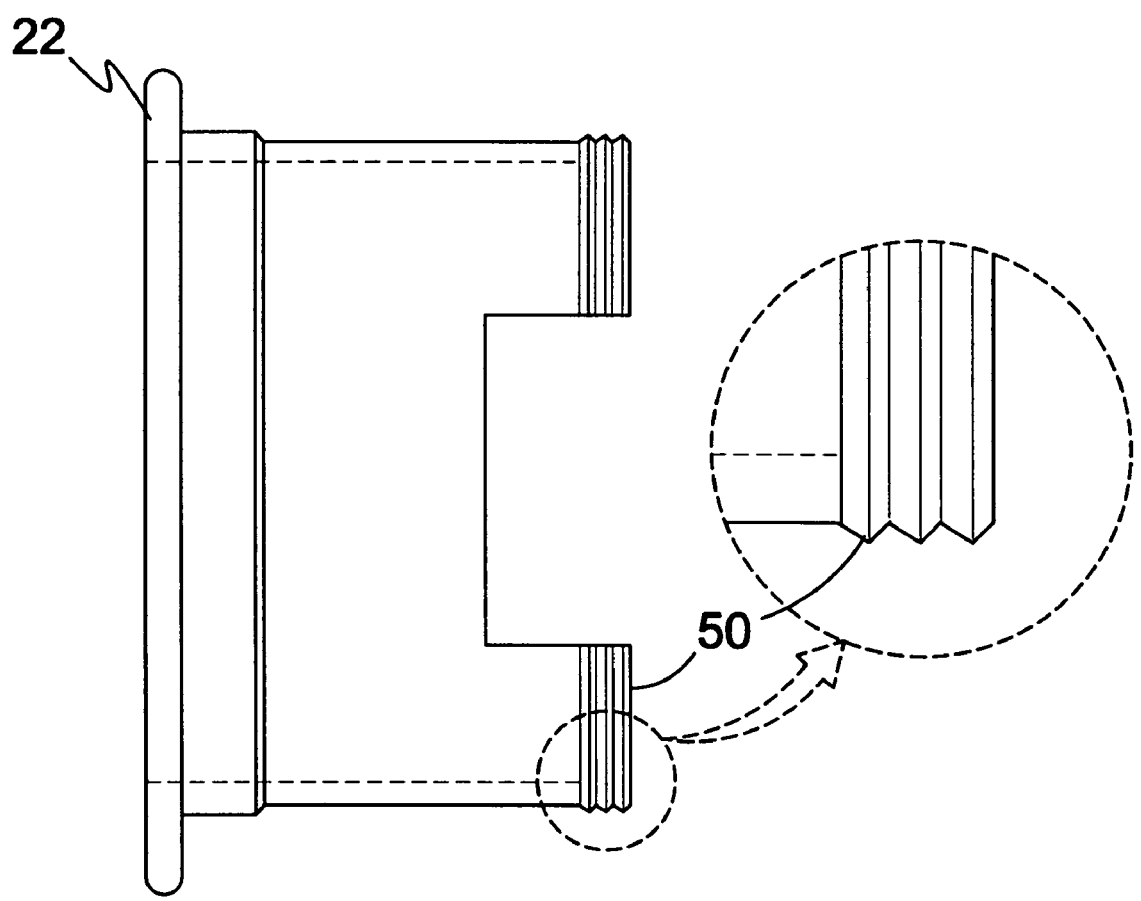
FIG. 9 is a sectional view of the inner collar of the present invention.

FIG. 9 is a sectional view of the inner collar 22 of the present invention. The lighting instruments provides rotational position movement with respect to the camera and subject, thereby allowing for varying the angle of incidence of the multiple pin hole light sources to the facets of the gemstone. By varying the angle of incidence of the pinhole light sources to the facets of the gemstone, varying refractive effects can be obtained. Shown in detail is the camera attachment means 50.

Figure 10:
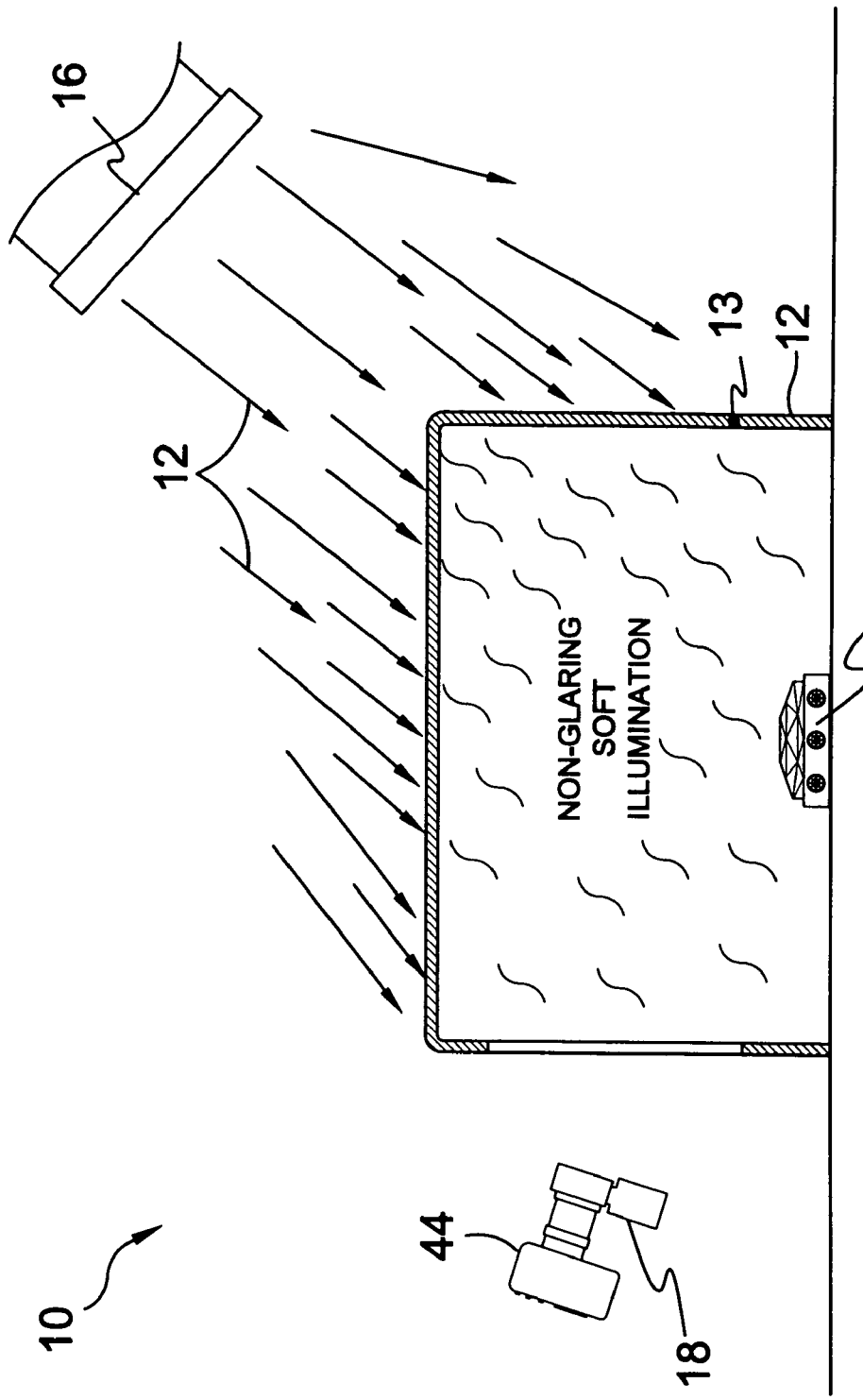
FIG. 10 is an illustrative view of the present invention.

FIG. 10 is an illustrative view of the present invention 10. Shown is the external light source 16 thrown light on the diffusion chamber 12 where it passes through the light diffusing material 13 to provide a soft, even, non-glaring diffused light throughout the interior 14 of the diffusion chamber 12. The lighting instrument 18 is attached to the camera 44 and aimed towards the gemstone 42 disposed within the diffusion chamber 12. The lighting instruments 18 provides rotational position movement with respect to the camera 44 and subject 42, thereby allowing for varying the angle of incidence of the multiple pin hole light sources to the facets of the gemstone 42. By varying the angle of incidence of the pinhole light sources to the facets of the gemstone 42, varying refractive effects can be obtained.

Figure 11:
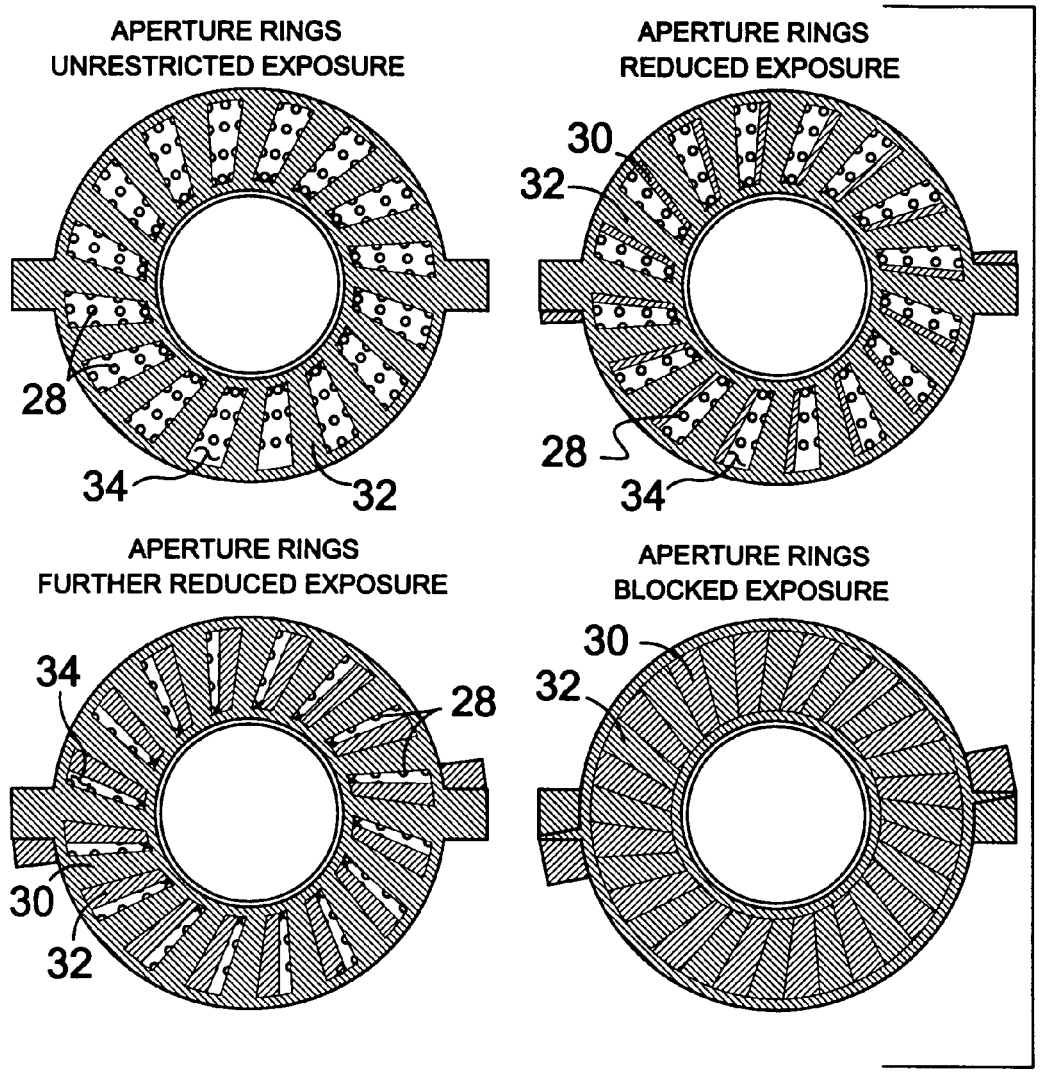
FIG. 11 is a front view of the aperture ring assembly of the present invention.

FIG. 11 is a front view of the aperture ring assembly of the present invention. The lighting instruments variable aperture is adjustable to permit varying number of pinholes 28 to pass light from the ring light to the subject. By rotating the first aperture ring 30 and the second aperture ring 32 and their respective slotted recesses 34 in relationship to each other and the camera lens, varying the number of pinholes 28 are allowed to pass light from the ring light to the subject gemstone. Varying the number and position of the pinhole 28 light sources to illuminate the gemstone, allows for a variety of refractive effects to be obtained in the gemstone.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method and apparatus for photographic illumination comprising:

a) an enclosed diffusion chamber comprised of a light diffusible material having a hollow interior with an opening to provide access of an article to be photographed therein into said interior;
b) at least one external light source directed towards said diffusion chamber; and
c) a lighting instrument camera attachment comprising:
  i) means for accepting the lens of a camera that attaches to said camera lens and has a central recess to provide an unimpeded view through the camera lens of said article;
  ii) an internal light-projecting means; and
  iii) a variable aperture collar assembly to provide a user selective means for adjusting the amount of light projected from said light-projecting means.

2. A method and apparatus for photographic illumination as recited in claim 1, wherein said variable aperture collar assembly comprises:
a) an inner collar;
b) an outer collar with a flange extending towards said inner collar;
c) a plurality of rows of pin holes concentrically disposed on said outer collar flange;
c) a first rotatable aperture ring disposed between said inner collar and said outer collar and in face-to-face relation with said outer collar flange; and
d) a second rotatable aperture ring disposed between said inner collar and said outer collar in face-to-face relation with said first aperture ring.

3. A method and apparatus for photographic illumination as recited in claim 2, wherein said light projecting means is disposed between said inner collar and said outer collar and behind said outer collar flange with an orientation projecting said light thereto.

4. A method and apparatus for photographic illumination as recited in claim 2, wherein said first aperture ring and said second aperture ring each have a plurality of corresponding slotted recesses extending radially therethrough.

5. A method and apparatus for photographic illumination as recited in claim 4, wherein said recesses of said first aperture ring and said second aperture ring can be selectively aligned and misaligned by the user as desired to vary the number of light beams emitted by said light source through said pinholes in said flange of said outer collar.

6. A method and apparatus for photographic illumination as recited in claim 5, wherein said light beams are projected through said opening of said diffusion chamber onto said article to be photographed.

7. A method and apparatus for photographic illumination as recited in claim 3, wherein said light-projecting means is a plurality of LED's.

8. A method and apparatus for photographic illumination as recited in claim 3, wherein said light-projecting means utilizes fiber optic lighting.

9. A method and apparatus for photographic illumination as recited in claim 1, wherein said article to be photographed is a gemstone.

10. A method and apparatus for photographic illumination as recited in claim 9, wherein said gemstone is faceted.

11. A method and apparatus for photographic illumination as recited in claim 6, wherein the number of light beams projected onto said article serves to generate refractive effects including, but not limited to, brilliance, sparkle and glitter.

12. A method and apparatus for photographic illumination as recited in claim 11, wherein said refractive effects are selectively adjusted by the user to create a desired effect by controlling the number of light beams projected onto said article.

13. A method and apparatus for photographic illumination as recited in claim 12, wherein said first aperture ring and said second aperture ring further include at least one protruding adjustment tab on each to allow the user to selectively rotate said aperture rings as needed.

14. A method and apparatus for photographic illumination as recited in claim 1, wherein said external light source is continuous.

15. A method and apparatus for photographic illumination as recited in claim 1, wherein said external light source utilizes a flash.

16. A method and apparatus for photographic illumination as recited in claim 13, wherein said external light source and said internal light-projecting means work in combination to provide a desired illuminated environment for photographing said article with said external light source being diffused as the light enters said interior of said diffusion chamber to create a soft, non-glaring ambient light proximal said article and the user-selected number of light beams from said internal light-projecting means serving to provide variable refractive effects as said light beams strike said article.

17. A method and apparatus for photographic illumination as recited in claim 16, wherein adjusting the angle of incidence that said light beams are projected onto said article provides greater versatility in achieving variable refractive effects.

18. A method and apparatus for photographic illumination including the steps of:
a) placing an article to be photographed into a chamber having walls fabricated of a light diffusing material;
b) directing an external light source onto the outer surface of said diffusion chamber;
c) mounting a lighting instrument camera attachment onto a camera;
d) aiming said camera with said lighting instrument attachment towards said article at a predetermined angle of incidence;
e) focusing said camera;
f) rotating a pair aperture rings comprising a plurality of corresponding slotted recesses disposed in face-to-face relation with each other and aligning said recesses accordingly to expose a desired number of pinholes in a flange disposed between said aperture rings and an internal light source thereby allowing a specific number of light beams to penetrate therethough to shine onto said article to be photographed and achieve a desired refractive effect; and
g) photographing said article.

* * * * *